United States Patent [19]

Schiefer et al.

[11] 4,118,838
[45] Oct. 10, 1978

[54] PIPE CLAMP

[75] Inventors: Erwin Schiefer; Heinz Bisping, both of Munich, Germany

[73] Assignee: Hilti Aktiengesellschaft, Schaan, Liechtenstein

[21] Appl. No.: 786,800

[22] Filed: Apr. 12, 1977

[30] Foreign Application Priority Data

Apr. 14, 1976 [DE] Fed. Rep. of Germany ....... 2616568

[51] Int. Cl.² ...................... F16G 11/00; A44B 21/00
[52] U.S. Cl. .............................. 24/115 R; 24/115 G; 24/263 R; 248/68 CB; 174/156
[58] Field of Search .......... 24/263 R, 249 LS, 20 TT, 24/115 G, 73 SA, 73 S, 73 AP; 248/68 CB, 74 A, 74 PB, 67.5; 174/156

[56] References Cited

U.S. PATENT DOCUMENTS

| 1,616,881 | 2/1927 | Wharton ........................... 24/115 G |
| 3,229,998 | 1/1966 | Pennington ....................... 24/263 R |

FOREIGN PATENT DOCUMENTS

| 221,618 | 6/1962 | Austria ................................. 24/263 R |
| 679,938 | 8/1939 | Fed. Rep. of Germany ........ 24/115 G |
| 1,025,960 | 3/1958 | Fed. Rep. of Germany ........ 24/115 H |
| 1,101,899 | 10/1955 | France ................................. 24/115 G |

*Primary Examiner*—Bernard A. Gelak
*Attorney, Agent, or Firm*—Toren, McGeady and Stanger

[57] ABSTRACT

A pipe clamp for use on pipe, cable or the like consists of a U-shaped base part forming an opening therethrough and a U-shaped fastening clip insertable into the opening through the base part. Toothed strips are provided on the interior surfaces of the base part and on the exterior surfaces of the clip for locking the two parts together. The base part has a closed bottom surface and an open top surface and two pair of opposite sides extending between the bottom and top surfaces. The fastening clip is inserted into the base part through the open top surface. A U-shaped opening is provided in each of one pair of opposite sides and the U-shaped opening narrows toward the top surface. The toothed strips are located in the other pair of opposite sides.

6 Claims, 3 Drawing Figures

PIPE CLAMP

SUMMARY OF THE INVENTION

The present invention is directed to a pipe clamp and more particularly to a two-part clamp consisting of a U-shaped base part having openings narrowing toward one side or surface through which the pipe extends and a fastening clip insertable into the base part with the two parts being secured together by toothed strips.

There are known cable or pipe clamps which have an opening for receiving the cable or pipe of a fixed cross section generally narrowing toward an open side of the clamp. Retention of the cable or pipe is achieved in such clamps by spring-type expandable legs. Depending on the deformation characteristic of the pipe, especially in the case of light plastic piping, the pipe is deformed into an oval shape as it is pressed into the clamp, and after being introduced it adapts itself to the generally round opening through the clamp. To secure the pipe or cable within the clamp it is known to use a fastening clip having expandable legs which locks onto the clamp by means of toothed strips.

In addition, especially for securing groups of cables in the clamp, a band is used which is connected to the clamp by extrusion or other means, or an additional element can be used, such as a top portion for the clamp.

Clamps having a fixed cross sectional opening in which the pipe or cable is held have the disadvantage that they can only be used to hold pipes or clamps of a narrow diameter range. As a result, it is necessary to maintain a large number of clamp sizes in stock.

Multi-part clamps, however, can be used for a wider diameter range of pipes or cables. The interconnection of the clamp parts is usually effected with a toothed construction which permits interlocking of the parts in different positions. Once the parts are locked together, however, it usually requires special tools to release them.

In the installation of pipes and cables, both of the above types of clamps are used and, as a result, a large stock of the clamps is required. Moreover, if there is a subsequent conversion from a cable installation to a pipe installation or vice versa it is necessary to replace the entire clamp.

It is a primary object of the present invention to provide a pipe clamp which is suitable for use with pipes of different materials, such as metal, plastic and the like and also for the attachment of cable or groups of cables.

In accordance with the present invention, the problems experienced in the past are overcome by providing a two-part clamp consisting of a fastening clip insertable into a base part with a locking means for securing the parts together formed on the interior of the base part and on the outer surface of the fastening clip.

With the clamp provided by the present invention, the cross sectional opening for the pipe or cable through the base part can be reduced within certain limits by means of the fastening clip which fits into the base part. By virtue of such an arrangement, the range of application of the clamp is considerably extended. Where the clamp is used for pipes or cables whose cross sectional shape corresponds to the cross sectional area of the opening through the base part or where the diameter of the pipes or cables is slightly larger than the cross section of the opening, the fastening clip can be omitted. Based on the present invention one clamp can be used for several different applications and considerable cost savings are possible by producing larger quantities of one type of clamp and also by providing simpler stockkeeping. The savings achieved may exceed the costs of a fastening clip, which amounts to a small fraction of the costs of the clamp, so that the complete clamp is less expensive than conventional simple pipe clamps.

In a preferred arrangement of the pipe clamp it consists of a base part of a somewhat box-like shape, open at the top, and with two opposite sides extending from the open top having U-shaped openings adapted to receive the pipe. The U-shaped openings have surfaces which converge toward the open top surface of the base part. The other pair of sides or walls extending from the top surface, incorporate the toothed strips which interengage with similar strips on the fastening clip which fits into the base part. Due to the box-like shape of the base part, the clamp, though its opposite sides have a certain elasticity, has sufficient stiffness provided for all sides of the part. Where the piping being installed in the clamp has an elastic characteristic it is unnecessary for the clamp to have a resilient opening. With the toothed strips located on the interior of the base part, they are protected on all sides against damage and against being blocked by dirt. If no fastening clip is used, the toothed strips are completely covered by the pipe or cable inserted into the clamp. If the clamp is to be converted to a different use at a later date, the toothed strips remain in perfect condition for use.

For providing lateral guidance for cables or groups of cables to be inserted into the clamp, it is advantageous if the inside dimension of the fastening clip, that is the dimension between its legs, is smaller than the maximum inside diameter of the openings into the base part. These dimensions are measured parallel to the bottom surface of the base part. With such an arrangement it is possible to reduce the height and width dimensions of the opening into the base part by means of the fastening clip. As an alternate arrangement, several different sizes of fastening clips can be used with a single base part each having a different width or open dimension between its legs. The differences in the open dimension between the legs of the fastening clip and the maximum inside diameter of the openings into the base part of the clamp should be about 5 to 30% of the inside diameter of the openings into the base part.

For the guidance of the fastening clip within the base part, it is advantageous if the width of the legs of the clip corresponds to the dimension between the inside surfaces of the base part between which the legs extend. In this arrangement, the fastening clip is guided directly by its legs and does not require any special guidance features. Further, this arrangement affords simplification of the base part.

To afford easy introduction of the fastening clip into the base part and to maintain the locking action between the two parts, the toothed strips in the parts are advantageously designed in a saw-toothed form. As a result, the force required for inserting the clip into the base part is small, while the retaining forces securing the parts together is quite great. For the purpose of exactly adapting the clamp parts to the diameter of the cable or clamp being secured, the pitch of the teeth in the strips should be kept small. If the locking engagement between the two parts must be released repeatedly, it is expedient to provide the tips of the teeth with rounded portions or to chamfer them.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
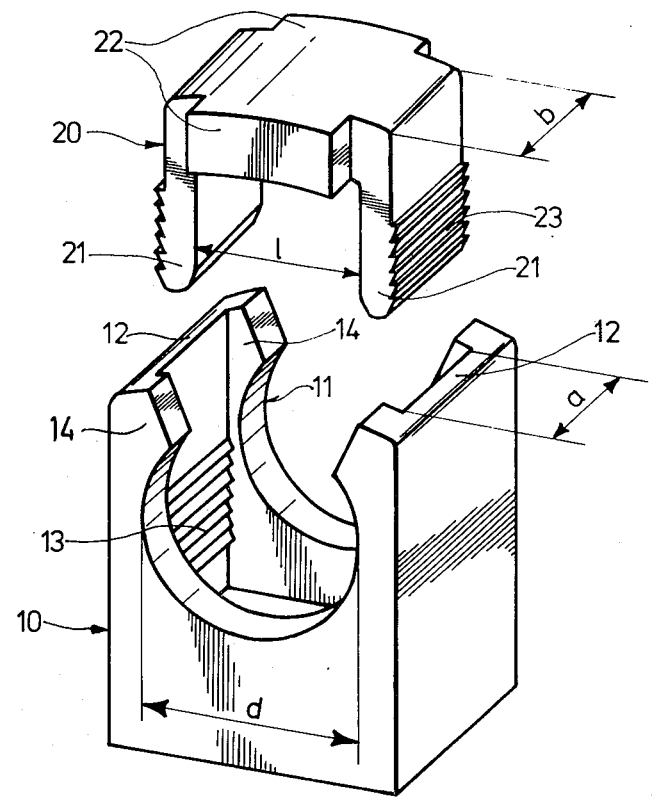
FIG. 1 is a perspective view of a two-part clamp embodying the present invention with the fastening clip aligned above the opening into the base part of the clamp.

As displayed in FIG. 1, the clamp embodying the present invention consists of a base part 10 and a fastening clip 20. The base part is a box-shaped member closed at its bottom surface and open at its top surface. Extending between the top and bottom surfaces are two pairs of opposite sides. The base portion has a generally U-shaped configuration provided by a pair of openings 11 located in one pair of the opposite sides with the other pair of opposite sides being spring-like, expandable legs 12. The inner surfaces of the legs 12 have oppositely disposed parallel counter toothed strips 13. The U-shaped openings 11 in the side walls 14 are arcuately shaped for a major portion of their circumference with the surfaces of the openings narrowing toward the top surface of the base part and then diverging to the top surface to provide ease in placing the clamp onto a pipe or cable. The strips 13 extend across the legs or side walls 12 between the other pair of opposite side walls 14.

The fastening clip 20 is a U-shaped member, however, relative to the U-shaped configuration of the base part 10 it is inverted so that its legs 21 depend downwardly, as viewed in FIG. 1. Legs 21 are disposed in parallel relation and the inside spacing "l" between the legs is smaller than the maximum inside diameter "d" of the openings 11 through the walls or sides 14. The dimension "d" is measured parallel to the bottom of the base part. When inserted into the base part, the legs 21 extend in the direction of the sides 12 between the inside surfaces of the sides 14 and the width "b" of the legs 21 corresponds substantially to the dimension "a" between the inside surfaces of the sides 14, that is, the sides containing the U-shaped openings 11. As a result of this arrangement, the fastening clip is guided as it is inserted into the base part 10. For better retention and to avoid any damage to cables inserted into the clamp, the fastening clip 20 has a pair of shoulders 22 extending laterally outwardly from the section which interconnects the legs 21. The shoulders have a dimension in the direction between the legs corresponding to the width of the narrowed cross section of the openings 11, note the shoulders in FIG. 3 where the clip is inserted into the base part. The outwardly facing surfaces of each of the legs 21 have toothed strips 23 extending in the direction of the "b" dimension of the legs, that is, corresponding to the direction in which the strips 13 extend in the base part. The strips 23 on the fastening clip 20 match the counter strips 13 on the base part. Strips 13, 23 have a sawtoothed shape and permit interlocking of the fastening clip 20 into the base part 10.

Figure 2:
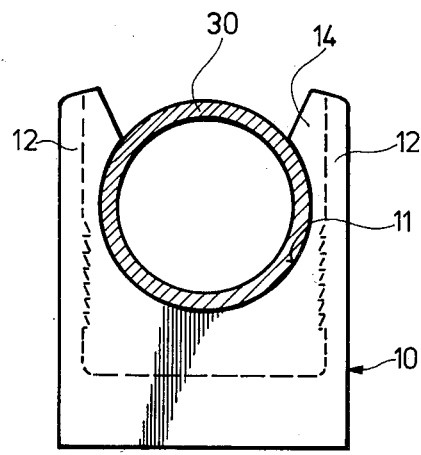
FIG. 2 is an elevational view of the base part of the clamp, without the fastening clip, securing a pipe.

In FIG. 2, the clamp of the present invention is shown being used for pipe fastening. In this embodiment only the base part 10 is utilized. Pipe 30 having cross sections corresponding substantially to the arcuate cross section of the opening 11, is introduced into the base part with elastic expansion of the legs or sides 12 or alternatively with deformation of the pipe itself. The retention of the pipe 30 is effected by the resilient action between the pipe and the openings 11 in the sides 14. Clamps of a certain size when utilized in this manner can be employed for a limited diameter range of pipe or cable.

Figure 3:
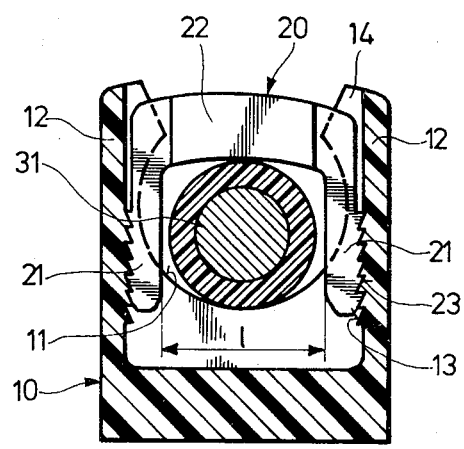
FIG. 3 is an elevational view, partly in section, of a clamp embodying the present invention with the fastening clip inserted into the base part and holding a cable.

In FIG. 3 the clamp is illustrated for use in fastening cable or pipes which have a smaller diameter than that of the openings 11 into the base part 10. After inserting a cable or pipe 31 through the openings 11, the fastening clip 20 is fitted over the cable or pipe into the base part 10 and locked by the interengagement of the toothed strips 13, 23. The cross section of the cable or pipe, as mentioned above, is smaller then the diameter of the openings 11. The diameter of the cable or pipe 31, however, must not be appreciably greater than the dimension "l" between the legs 21 of the fastening clip 20. To release the clip 20, the spring-like legs 12 of the base part 10 can be expanded by means of a tool, for example, a screwdriver. The shoulders 22 on the fastening clip 20 prevent the wedging of the cable or pipe 31 within the clamp.

While specific embodiments of the invention have been shown and described in detail to illustrate the application of the inventive principles, it will be understood that the invention may be embodied otherwise without departing from such principles.

What is claimed is:

1. Pipe claim such as used for retaining pipe, cable and the like, comprising a U-shaped base part having a bottom surface, a top surface and sides extending between said bottom and top surfaces, said base part forming an opening therethrough between opposite sides thereof, a fastening clip engageable with said base part for securing pipe or the like in the opening through the base part, first engagement means located on said fastening clip, second engagement means located on said base part and engageable with said first engagement means for securing said fastening clip to said base part, wherein the improvement comprises that said sides of said base part comprise a first pair of opposite sides and a second pair of opposite sides with each of said sides having an inwardly facing surface and an outwardly facing surface and the inwardly facing surfaces of said sides defining an open space within said base part with the open space being open through the top surface of said base part and the open space forming a portion of the opening through said base part, said fastening clip is releasably insertable downwardly through the top surface of said base part into the open space therein so that at least a part of said fastening clip is wholly laterally enclosed by said sides of said base part, said fastening clip has outwardly facing surfaces directed away from one another and inwardly facing surfaces directed toward one another, said fastening clip is U-shaped and includes a pair of laterally spaced legs each having one of the outwardly facing surfaces and one of the inwardly facing surfaces of said clip, and a section extending transversely of and interconnecting one end of each of said legs, said fastening clip being insertable into the open space in said base part legs first, said second pair of opposite sides of said base part each having a U-shaped opening therein with the U-shaped openings extending to and through said top surface of said base part, the U-shaped openings communicating directly with the open space within said base part and in combination with the open space forming the opening through said base part, a major portion of the U-shaped openings including a major portion of the opposing sides thereof being arcuately shaped, the maximum diameter between the opposing arcuately shaped sides of the U-shaped openings through said second pair of opposite sides which diameter extends substantially parallel to the bottom surface of said base part is greater than the dimension between the inwardly facing surfaces on said legs of said fastening clip and is less than the dimension between the inwardly facing surfaces of said first pair of opposite sides, said first engagement means located on said outwardly facing surfaces of said fastening clip, and said second engagement means located on the inwardly facing surfaces of the sides of said base part.

2. Pipe clamp, as set forth in claim 1, wherein said first and second engagement means comprising toothed strips.

3. Pipe claim, as set forth in claim 1, wherein the dimension of said legs of said fastening clip extending between the inwardly facing surfaces of said second pair of opposite sides of said base part is substantially the same as the dimension between the inwardly facing surfaces of said second pair of opposite sides of said base part.

4. Pipe clamp, as set forth in claim 2, wherein said toothed strips on said base part and on said fastening clip each having a sawtooth shape.

5. Pipe clamp, as set forth in claim 3, wherein the U-shaped openings in said second pair of opposite sides each having a narrowed entrance into the opening adjacent said top surface with the entrance having a dimension parallel to the bottom surface of said base part which is less than the maximum diameter between the opposite arcuately shaped sides, said fastening clip having a shoulder extending laterally from each of the opposite sides of said interconnecting section which extend between said legs and said shoulders each having a dimension in the direction extending between said legs so that said shoulders each fit closely within the narrowed entrance of the U-shaped openings in said second pair of opposite sides.

6. Pipe clamp, as set forth in claim 5, wherein the opposite sides of said U-shaped openings between the narrowed entrance thereof and the top surface of said base part being disposed in diverging relationship toward the top surface of said base part.

* * * * *